though to

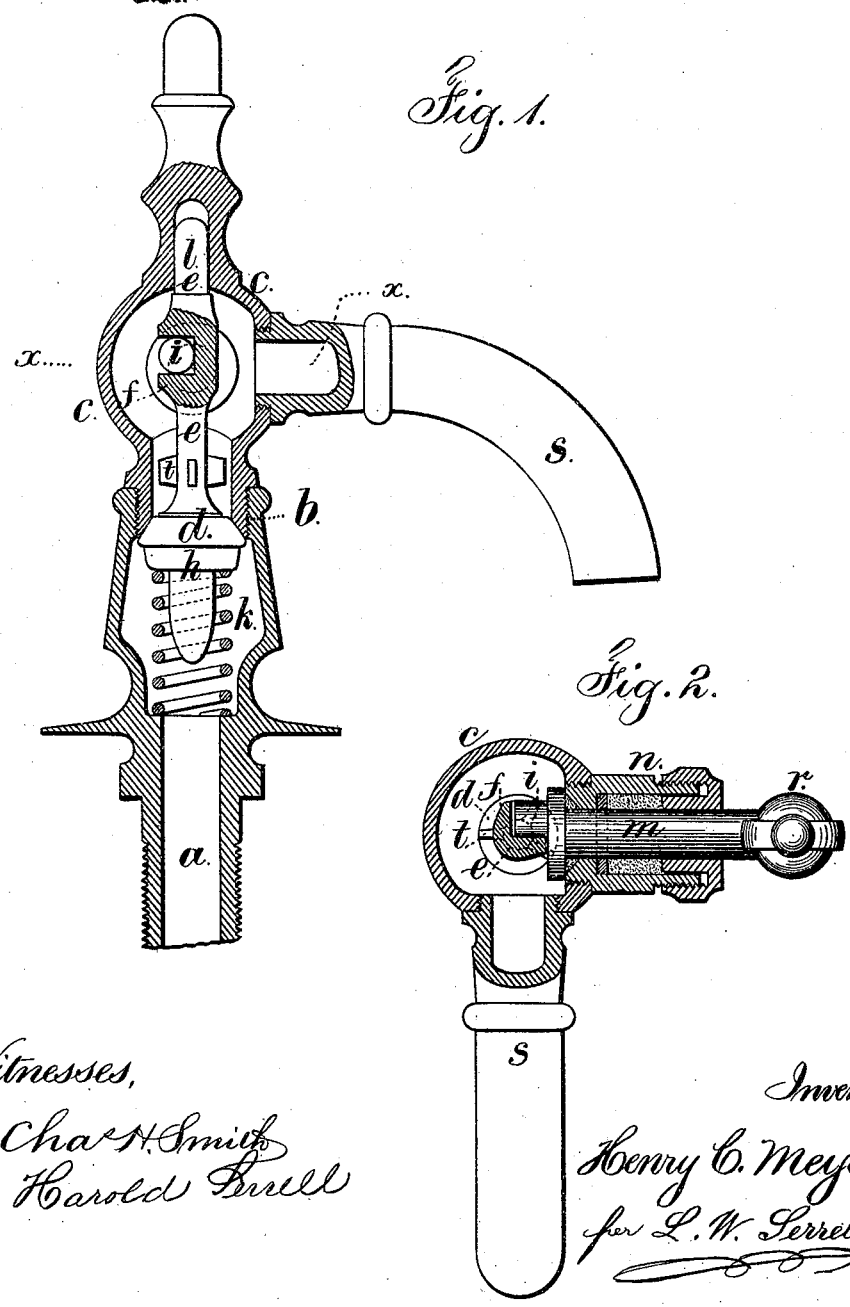

UNITED STATES PATENT OFFICE.

HENRY C. MEYER, OF NEW YORK, N. Y.

IMPROVEMENT IN SELF-CLOSING FAUCETS.

Specification forming part of Letters Patent No. 179,717, dated July 11, 1876; application filed April 17, 1876.

*To all whom it may concern:*

Be it known that I, HENRY C. MEYER, of the city and State of New York, have invented an Improvement in Self-Closing Faucets, of which the following is a specification:

In Letters Patent No. 167,092, granted to A. Fuller, a faucet is shown with a valve of india-rubber closing against the seat in the direction of the flow of the water, and operated by a spindle and crank-pin passing through a stuffing-box.

I avail of this general character of valve and actuating-spindle; but I combine with the same a spring that acts to press the valve toward its seat, and I arrange the other parts in such a manner that the crank-pin cannot be turned into such a position as to hold the valve open. Hence, when the handle of the faucet is liberated the valve closes against the seat.

In the drawing, Figure 1 is a vertical section of the faucet complete, and Fig. 2 is a sectional plan at the line $x\,x$.

The supply-pipe $a$ is connected by the screw at $b$ to the body $c$ of the faucet, and at the end thereof is the seat for the valve $d$, which valve $d$ is of india-rubber, upon a stem, $e$, and clamped by the tapering nut $h$, which tapering nut also forms a steady-pin for the spring $k$, which serves to close the valve.

The stem $e$ is guided at $l$ in the end portion of the cock-body $c$, and at $f$ the stem is made with an enlargement, containing a slot for the pin $i$ at the end of the stem $m$. This stem $m$ passes through a stuffing-box, $n$, substantially the same as in aforesaid patent; and there is a handle, $r$, at the end of the stem for operating the same. A bib or discharge-nozzle, $s$, passes off at one side of the body $c$ of the faucet.

It will now be understood that the valve can be opened by turning the handle $r$, stem $m$, and crank-pin $i$, so as to press the enlargement $f$, stem $e$, and valve $d$ endwise, and move the valve away from its seat; and when the handle is liberated, the spring $k$ restores the parts to their normal position, closing the valve.

I employ the wings $t$ upon the stem of the valve within the water-way to retain the stem in a central position, and the slot in the enlargement $f$ is not long enough transversely of the stem to allow the crank-pin to be turned as far as the center of the spindle in either direction; hence the valve cannot be blocked open; but the pressure of the spring $m$ is sufficient to move the crank-pin, and turn the stem thereof in the stuffing-box or gland. The stem $e$ of the valve being guided at both sides of the crank-pin $i$, the pressure of such crank-pin cannot displace the valve-stem.

I claim as my invention—

The combination, in a self-closing faucet, of the spindle $m$, gland $n$, crank-pin $i$, valve-stem $e$, guided at $l$, and having a transverse groove for the pin $i$, elastic valve $d$, spring $k$, and guides $t$, substantially as and for the purposes set forth.

Signed by me this 10th day of April, A. D. 1876.

HENRY C. MEYER.

Witnesses:
GEO. T. PINCKNEY,
CHAS. H. SMITH.